United States Patent [19]
Phillips

[11] 4,146,219
[45] Mar. 27, 1979

[54] DOCUMENT TRANSPORT APPARATUS

[75] Inventor: Kenneth G. Phillips, Bream, Near Lydney, England

[73] Assignee: Xerox Corporation, Stamford, Conn.

[21] Appl. No.: 687,061

[22] Filed: May 17, 1976

[30] Foreign Application Priority Data

Oct. 24, 1975 [GB] United Kingdom ............... 43933/75

[51] Int. Cl.² ........................ B65H 9/04; B65H 5/02
[52] U.S. Cl. ................................. 271/233; 198/842; 271/275; 271/DIG. 9
[58] Field of Search ............ 271/233, 4, 275, 272–274, 271/264, DIG. 9, 6, 7, 117, 34; 355/76; 198/577, 842, 843

[56] References Cited

U.S. PATENT DOCUMENTS

| 3,510,125 | 5/1970 | Krueger et al. | 271/233 X |
| 3,790,158 | 2/1974 | Summers et al. | 271/4 |
| 3,924,847 | 12/1975 | Pescetto | 271/DIG. 9 |

Primary Examiner—Bruce H. Stoner, Jr.

[57] ABSTRACT

An automatic document handler employing reversible belt means for moving the documents onto the exposure platen of a reproduction machine and registering the documents thereon, a variable pressure roller being provided to increase the belt normal force against the document when moving the document onto the platen and for reducing the belt normal force while registering the document thereon.

6 Claims, 4 Drawing Figures

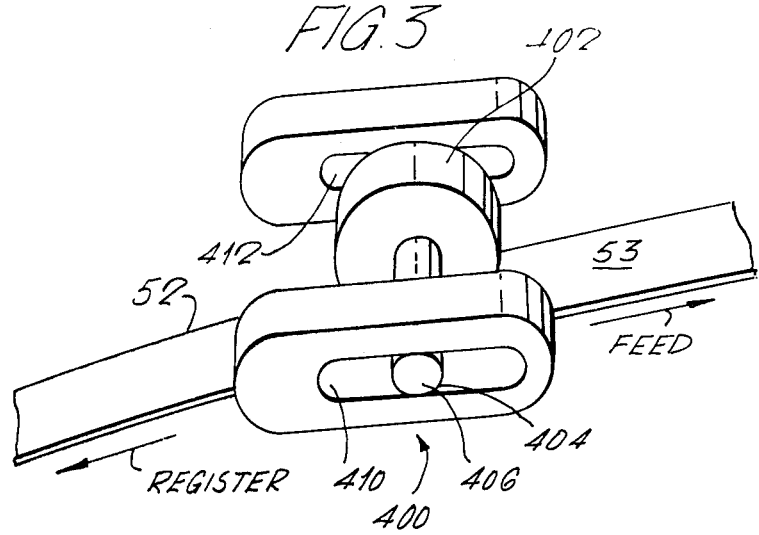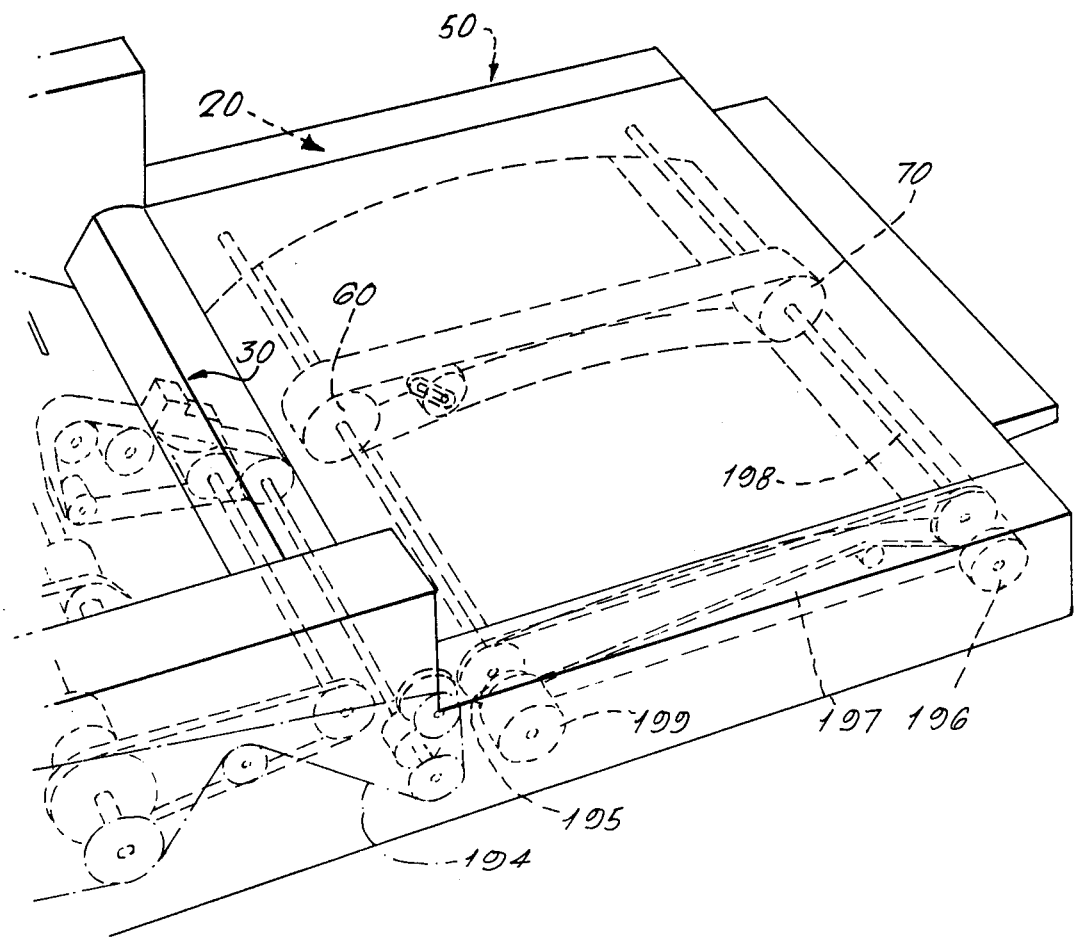

DOCUMENT TRANSPORT APPARATUS

BACKGROUND OF THE INVENTION

This invention relates to a document handling apparatus and specifically concerns a means for automatically moving sheets of material sequentially into a predetermined position on a work surface and then moving that sheet of material out of that position to make room for the next sheet.

As will be understood by referring to the commonly assigned U.S. patent application Ser. No. 687,062, now U.S. Pat. No. 4,076,233, filed on even date herewith and which is incorporated herein by reference, quick and accurate movement of documents to a registered predetermined location and removal of these documents is important in the processing of sheet material in environments such as copying machines. In a copying machine, an automatic document handler must not only rapidly move the document onto a platen, but must accurately register that document in a specific predetermined copying position or area to assure the production of a complete and visually acceptable copy. If the document is situated on the platen in a skewed or misaligned position, the copy will reflect this same skew or misalignment and may be incomplete and/or unacceptable to the user. If the original is wrinkled, torn or creased it may not produce good copies and will not be acceptable to the user for a great number of reasons, not the least of which may be unsuitability for subsequent use in a machine or automated processor. Moreover, the automated handler must be able to perform these functions efficiently with maximum range of paper or material weights, as documents copied may vary from light weight paper such as what is known as "onion skin" in the order of 50 grams per square meter to much heavier weights in the order of 120 grams per square meter.

While the prior art has concerned itself with document handling apparatus which moves a document onto a work surface, registers it and then moves it on, it has failed to recognize, so far as we are aware, the invention herein according to which there is provided a document handling apparatus comprising document transport means having a first surface alternately movable in opposite first and second directions and of a material adapted to frictionally engage a document, the apparatus comprising variable friction producing means for providing a high frictional engagement between the transport means and the document when said transport means is moving in said first direction and relatively low frictional engagement between the transport means and the document when said transport means is moving in said second direction.

According to one aspect of the invention the variable friction means comprises a pressure applying means that is positioned in engagement with a second surface of the transport means opposite from the first document engaging surface. The pressure applying means may be pinch roll having an axle, the ends of which project from opposite sides thereof, said axle ends each being engaged in parallel elongated slots inclined at an acute angle to the portion of the first surface of the transport means therebelow, whereby when said transport means moves in a first direction said roller axle is urged down said inclined slot toward said transport means to increase the pressure on said second surface and when said transport means moves in said second direction said roller is urged up said slot to reduce the pressure on said surface.

According to another aspect of the invention the variable friction means comprises a means for pushing or pulling said first surface of said transport means whereby when said first surface is pushed it exerts a lower coefficient of friction with the surface over which it is pushed than it would exert against same surface when it is pulled.

BRIEF DESCRIPTION OF THE DRAWINGS

In order that the invention may be more fully understood, a preferred embodiment thereof is described with reference to the accompanying drawings in which:

FIG. 3 is an enlarged view of a pressure roll means; and,

FIG. 4 is a schematic perspective view of another embodiment of the invention showing an embodiment of a tight-slack embodiment of the invention.

DESCRIPTION OF THE PREFERRED EMBODIMENT

Figure 1:
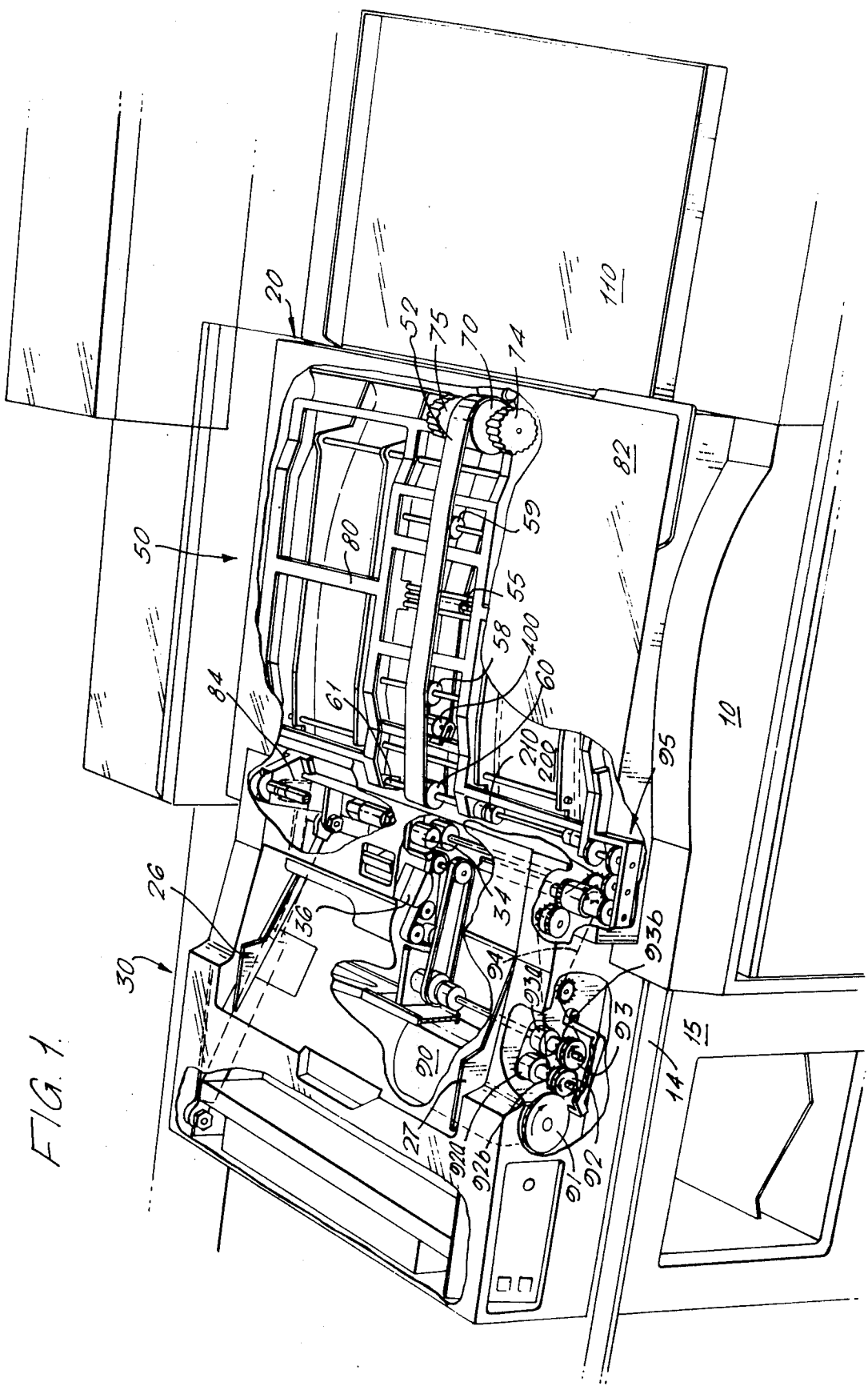
FIG. 1 is a perspective view of a document handling apparatus in place on a copying machine and showing an embodiment of the wedge roll variable friction means.

Referring to FIG. 1 of the drawings there is shown a portion of an automatic electrostatic reproduction machine 10 of the type disclosed in U.S. Pat. No. 3,301,126, having a document handling apparatus of the invention generally indicated at 20 overlying a work station comprising an exposure area of platen 12 of the machine 10 and extending over an upper surface 14 of a sorter extension 15 of the machine. The document handler 20 is synchronized with the control of the machine 10 to automatically feed documents, (which documents may also be referred to as "originals" to distinguish them from their copies) to the platen 12, register them, hold them in position until the selected number of copies have been produced by the machine 10 as required and then remove them from the platen while feeding the next document to be copied. One method of producing the copies by the machine 10 will be understood for example by reference to the above mentioned U.S. Pat. No. 3,301,126 from which it will be seen that the platen 12 is illuminated from below by the lamps 13 in FIG. 2 and the image on an upper surface 12a of the platen reflected onto a photoreceptor surface (not shown here) where the image is developed and from which it is transferred to a suitable substrate to produce the copy.

Document handling apparatus 20 generally comprises a sheet material feeder means 30 and a document transport means 50. The feeder means 30 includes a document supply tray 24, a separator means 32 and a pair of advancing or pinch rolls 34 which are adapted to feed any relatively bendable sheet-like material such as paper, film, etc., one sheet at a time from a quantity of documents, which may be of random size and thickness, to a predetermined position where the document transport means 50 may take control.

For specific details of an embodiment of a sheet separator means 32 which has been found to perform particularly well in this environment reference may be made to copending U.S. patent application Ser. No. 687,060, now abandoned filed on even date herewith.

In operation, documents 22 which may be of the ordinary business type having generally straight and parallel forward and rear edges 22a, 22b respectively, are placed face down for copying in the inclined tray 24 so that the forward edge 22a of the document will be held normal to the direction of document travel by a suitable restraining means 36.

The alignment of the document feed means 32 relative to the processing station 12, which may be an exposure station, is preferably such that the center line of the documents remains at generally the same position regardless of the width of the document. This alignment is provided by a pair of self-centering side guides 26 and 27 on opposite sides of the supply tray 24 which restrain the side edges of the documents generally parallel to the direction of feeding movement and tend to assure the feeding of documents from a central area of the stack or pile regardless of the width of the stack.

With the document thus in place and the processor 10 set to make the required number of copies of each document 22, automatic operation is initiated by activation of a suitable "start print" control.

From its position on the bottom of the document pile in tray 24, the first document is separated from the remainder of the stack by the separating means 32 and fed forward over a guide 33 so that its forward edge 22a enters into the nip of the driven pinch rolls 34, which rolls pull the document 22 completely from the tray and move its forward edge 22a over a registration edge means 40 and under the control of the transport means 50.

The document transport means 50 preferably comprises an endless belt means 52 riding over and extending between a first roller means 60 and a second roller means 70, whereby the belt means 52 is movable in alternate first and second directions. The roller means 60 and 70 rotate on shafts 61 and 71 respectively which are mounted on a movable frame means 80 located centrally along opposite sides 12b and 12c c of the platen upper surface 12a so that the belt entrained thereover extends across the central portion of the platen or processing station 12, as may be best seen in FIG. 2. The frame 80 supports a suitable outer cover 82 which hides the moving parts and prevent light from entering the platen 12. glass Preferably the first roller means 60 is of small diameter (e.g., 1.5 inches) so that a nip 62 between the belt means 52 entrained thereover and the platen surface 12a may be as close as necessary to the edge 12b of the platen and to the paper feed means 30. The belt means 52 rests on the platen surface 12a and is made of a material such as silicone rubber on a flexible backing and is preferably white on its outer surface and has a high coefficient of friction with paper type materials, e.g., $1.0-1.5\mu$. The platen surface 12a will usually be smooth glass so that its coefficient of friction with the paper or belt is relatively low, e.g., less than $1.0\mu$. Consequently, a document in the form of a material with a high coefficient of friction such as paper for example, will be effectively gripped by the belt 52 on its upper side when it is fed into the nip 62 and caused to slide over the surface 12a on its lower side under the control of the belt means 52.

A registration member 40, functioning to align documents in a predetermined relationship, extends along platen edge 12b and is arranged so that documents being fed toward the platen 12 in a first direction pass smoothly thereover; however, it includes an edge 42 raised above the surface 12a so that once a document passes thereover and is moved in a second, reverse, direction, the trailing edge 22b of the document held against the surface 12a will abut thereagainst. A baffle member 200 may be provided, as set out in copending U.S. patent application Ser. No. 687,059, now U.S. Pat. No. 4,043,550, filed on even date herewith, to assure proper abutment of the document edge against the registration surface 42. As is known from U.S. Pat. No. 3,301,126 suitable indicia may be provided on the registration member to allow manual alignment of documents when the machine is being used in a manual mode.

Figure 2:
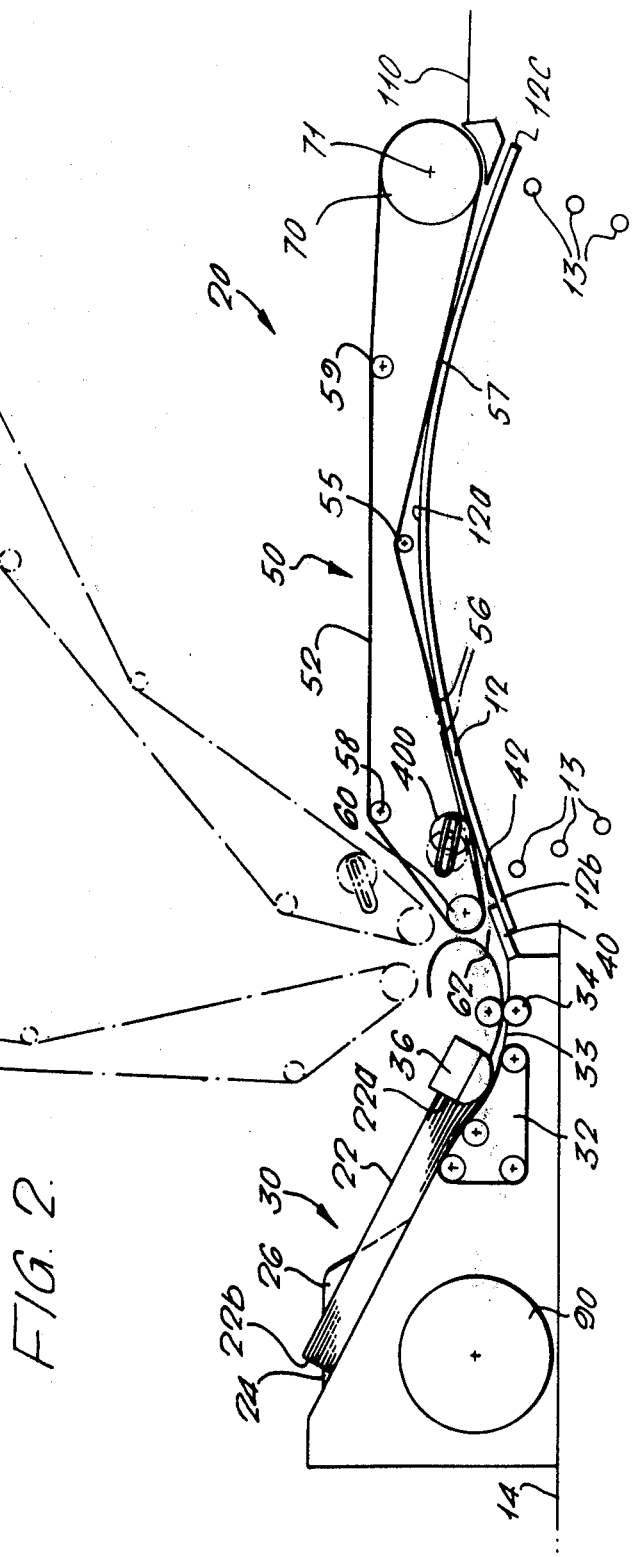
FIG. 2 is a schemative cross-sectional view of the apparatus of FIG. 1.

A support means 55 for the belt means 52 is positioned on the outside of the belt means 52 to form a hitch above the platen 12 at an intermediate point between the first and second roller means 60, 70 respectively so that the belt means contacts the processing station surface 12 at two separated contact areas 56, 57 along its length, one being on each opposite side of said intermediate point, as is shown in FIG. 2. Preferably, the intermediate point is generally halfway between the first and second roller means. In practice we have found that contact areas of two to three inches in length provide sufficient control of the document. The belt support means 55 preferably is a highly durable material having a coefficient of friction such as Delrin (Trademark) for example. It may be of fixed configuration as shown or may take other equivaient forms.

Other idler rollers such as shown in 58, 59 may be provided as required at other positions along the length of the belt means 52. These may be positioned to adjust belt tension.

The separated contact areas have the advantage that the area of frictional engagement between the belt means and the document may be set to assure a good grip of the document by the belt as it is being moved onto the platen 12, but yet allow pivoting of the document in a generally central area as shown in FIG. 4 so that any skew may be corrected when the document is moved by the belt against the registration member 40. With a full width belt, frictional contact between the document and the belt tends to be so great that no amount of skew of the document can be corrected on registration and the document will buckle.

A further advantage of the multiple contact areas is that the functions of document positioning and ejecting are separated. Generally, for the most part the former is controlled by the area 56 and ejection from the platen is controlled by the area 57. The magnitude of the forces on the document may be controlled by varying the coefficient of friction of belt support means 55. Thus, the higher the coefficient of friction of means 55, the greater the tension difference on either side of the support means.

An additional benefit of the intermediate support 55 is to limit the amount of sag in the belt means 52 when the transport means 50 is lifted from its operative position on the platen to an inoperative position above the platen as shown for example by the dotted lines in FIG. 2, and in FIG. 4.

By using a narrow belt means 52 with a crowned roller means 60, 70, construction is greatly simplified in that no side guides are required and tracking problems are greatly reduced from what they are known to be with a wide belt. Thus, we have found that a wide belt, or one with a length to width ratio of less than about 35-1 does not track accurately without guides and/or very expensive precise alignment of the pulley axes and therefore may have a tendency for sideways movements which could cause skewing of the document.

We have found that a narrow belt by contrast, i.e., one of greater than a 35-1 length to width ratio, tracks very well without any guides and does not cause the document to skew.

Operating the belt means 52 in a stable condition on crowned pulleys or rollers 60, 70 without edge guides eliminates the belt edge wear and possible detracking which may occur under unstable conditions. Accordingly, maintenance is minimized. The drive roller means 60, may advantageously be rubber tired to improve traction.

Ejection of documents from the platen 12 is initiated by the belt means 52. However, the final push onto an output tray 110 is assisted by a pair of ejection rollers 74, 75 which are coaxial with the second roller means 70. The pair of ejection rollers avoid skewing the document during ejection to provide a neat readily collectable output.

Power to drive the paper feeder means 30 and the belt transport means 50 is supplied by a motor 90 which may be advantageously located under the document tray 24. Rotary motion is transmitted from the motor drive gear 91 to a pair of counter rotating gears 92, 93 which in turn are each connected via clutch means 92a, 93a to chain drive sprockets 92b, 93b respectively whereby alternate engagement of the clutches will transmit counter clockwise or clockwise rotation respectively to a chain drive means 94. A clutch surface between the gears 92, 93 and sprockets 92, 93b is engaged or disengaged by a clutching means which is electrically energized in response to machine control logic. The chain drive means 94 in turn causes the pinch rolls to drive intermittently and a series of interconnected gears generally indicated at 95 to alternately drive axis 61 and the first roller means 60 in opposite first and second directions and turn the platen baffle lift means 210 as required.

In operation, as the sheet feeder 30 begins to separate and feed document 22, the platen baffle means 200 is raised by the left means 210 to open a document entrance gap below it and above the registration member 40 so that documents advanced by the pinch rolls 34 will enter the gap. When the pinch rolls 34 pass the forward or leading edge 22a of a document toward the nip 62 of the document transport means 50, a sensing switch located between them is tripped which causes a trailing edge 22b of the document to be detected. After a small delay, the baffle 200 is caused to close against member 40 and the belt means 52 is caused to reverse to the second direction. The reverse movement of the belt means is timed to allow the trailing edge to abut the registration surface 42 and cause the belt means 52 to slip over it briefly to assure full registration and correction of any skew.

We have found that while a high frictional force between the belt means 52 and the document 22 is essential when the belt means 52 is moving in the first direction to convey the document onto the platen surface 12a or to eject it therefrom, this high frictional force is a disadvantage when registering the document against the top member 40 because during registration, slippage must easily occur between the belt and the document if skew is to be properly corrected. This prevents a dilemma between keeping the force of the belt means high enough to prevent slip in the first instance when pulling the document onto the platen and moving it off, yet low enough in the second instance so that slip will occur during registration.

According to our invention we have found that a variable friction means may be provided for the outer or first surface of the belt means 52 whereby a lesser frictional force is exerted on the document 22 when the belt is moving it in the second registering direction than it did when moving the document in the first direction.

One means of accomplishing this differential pressure is by the provision of a wedging pressure or pinch roll means 400, as shown in detail in FIG. 3, which comprises a rubber surfaced roller 402 rotatably on an axle 404, the ends 406 of which project from opposite sides thereof and are slidingly engaged in parallel elongated slots 410, 412 respectively which are inclined at an acute angle of less then 30° to the portion of the first surface of the transport means 52 therebelow. The slots are of a width just slightly larger than the axle ends 406 and of a length such that they allow room for movement of the axle toward the belt 52 when the roller 402 is resting on a second, inner surface 53 of the belt means 52. Thus, when the transport belt means 52 moves in the first direction the ends of roller axle 404 are urged down the inclined slots toward the belt to exert greater pressure on the second side of belt means 52 which increases the friction of the belt with the surface in contact with the first side of the belt. On the other hand when the belt 52 moves in the second, reverse direction, the roller is urged to move its axle up the slot until it just rolls on the belt 52 exerting only its own weight to remove the increased pressure on the second side. The reduced pressure allows slippage of the belt means 52 when registering the document against the surface 42 so that the document may be easily move about to correct skew.

With the pinch roller means 400 arranged at a point along the transport belt means 52 that is normally out of contact with the surface 12a, as shown in dotted lines in FIG. 2, the movement of the roller means toward the surface 12a will increase the area of the belt means that can be in contact with the document 22 thereby enhancing the frictional contact between belt and document. At the same time, the tension in the belt means is increased, further increasing the frictional contact between belt and document.

In tests to measure the relative forces involved as a result of the pinch roll means it was found that with the roll means 70 being driven the following torque was required in each example:

1. belt transporting document in first direction onto platen without pinch roll — 0.96 in./lbs.

2. same as 1 but with pinch roll — 1.33 in./lbs.

3. belt registering document in second direction with or without pinch roll where document slips on glass — 0.96 in./lbs.

4. same as above except belt slipping on document — 1.4 in./lbs.

In each example, the coefficient of friction of paper of 80 grams per square meter to a silicone rubber belt was 0.84 under static conditions and 0.5 under dynamic conditions while the coefficients of friction of paper to glass were 0.16 for static conditions and 0.13 for dynamic conditions.

Although a preferred embodiment of means for producing variable friction between a transport and a document being moved have been described in detail, it will be understood that other embodiments of inventions may possibly be used. For example, a skid arranged with an over center pivot may be used to give force amplification in one direction. Similarly a material having directionally different coefficients of friction may be used in concert with the other means.

A further means of producing variable friction between a transport and a document being moved is to employ a taut belt to move the document onto the platen 12 and to use a slack belt to reverse the document and register it. Thus, as shown in FIG. 4, when the first surface of the belt means 52 is pulled by driving roller means 70 in a first direction it will be under a relatively high tension that will produce a higher frictional force on the document 22 being transported whereas when the same belt means is effectively pushed by reversing the drive of roller means 70, it will produce a lower frictional force on the document 22. FIG. 4 illustrates an arrangement of this embodiment wherein the second roller means 70 is driven by the motor 90 through a chain drive 194 and interconnected gears 195, a chain drive 197, a clutch 196 and a shaft 198 that transmits rotary motion to roller means 70. The chain drive 194 is driven by gears 92, 93, in alternate directions and clutch 196 is engaged when movement is necessary.

Closure of baffle 200 against the registration member 40 prevents movement of the trailing edge 22b over the registration edge 42 and minimizes the opportunity of the document 22 to buckle. In practice paper weights in a limited range of 47 to 120 grams per square meter have been very successfully handled, giving rise to the belief that a much greater range may be accomodated.

Accurate registration of the document 22 on the exposure surface 12 is essential in that the relationship between a document to be copied, the mechanism by which it is to be copied and the material onto which it is to be copied are very precisely predetermined so that if registration is off, the copy will not, in most cases of 1:1 copying onto document sized paper, include all of the original document. Even where document margins are such that essential information would be lost as a result of misregistration, nevertheless the aesthetics and integrity of copy would be severely reduced in the eyes of a reader. In most cases, it just would not look acceptable and hence the information it conveys may suffer as a result. Accordingly, this is not acceptable.

After the document has been registered, the predetermined number of copies are made and the logic control activates the document handler 20 to eject the copied document and forward the next document for registration and copying in similar fashion. This continues until a sensing switch (not shown) in the tray 24 detects the absence of documents and automatically stops the apparatus.

Although the invention has been described in terms of a single narrow centrally located belt means 52 it is within the scope of this invention that the centrally located belt means may comprise two or more parallel narrow belts.

While the preferred embodiment described has included a curved platen it will be understood that the invention herein is not so limited but applies as well to flat platen and other processing station configurations. Morover, it will be understood that the terms ∓platen" and "exposure area" are intended to include any work station where a sheet of material is to be positioned so far as practical in a predetermined place. Thus, generally it matters not for what reason the sheet material is so positioned or the specific act performed upon it. For example, the "exposure" may include electronic scanning or magnetic read off.

While we have described and illustrated herein a preferred form of the invention, it will be apparent to those skilled in the art that changes and modifications may be made thereto without departing from the spirit and intent of the invention which is limited only to the scope of the appended claims.

What is claimed is:

1. A document handing apparatus comprising document transport means having a first surface alternately movable in opposite first and second directions and of a material adapted to frictionally engage a document, the apparatus including variable friction producing means for providing a high frictional engagement between the transport means and the document when said transport means is moving in said first direction and a relatively low frictional engagement between the transport means and the document when said transport means is moving in said said second direction, said variable friction producing means including a pinch roller positioned in engagement with a second surface of said transport means opposite said first, document-engaging surface, said pinch roller having an axle the ends of which project from opposite sides thereof, said axle ends each being engaged in parallel elongated slots inclined at an acute angle to the portion of the first surface of the transport means therebelow whereby when said transport means moves in a first direction said roller axie is urged down said inclined slot toward said transport means to increase the pressure on said second surface and when said transport means moves in said second direction said roller is urged up said slot to reduce the pressure on said second surface.

2. A document handling apparatus according to claim 1 wherein said transport means is an endless belt entrained over first and second roller means and said variable friction producing means is positioned between said roller means.

3. A document handling apparatus according to claim 2 wherein said variable friction producing means is positioned such that it increases the area of frictional contact between said transport means and said document when said transport means moves in said first direction.

4. A document handling apparatus according to claim 3 wherein said transport means is a narrow endless belt having first surface portions bearing against a smooth platen surface, said belt first surface having a low coefficient of friction with the platen surface and a high coefficient of friction with ordinary document material.

5. A document handling apparatus according to claim 4 wherein said belt has first and second areas of contact with said platen surface, said pinch roll contacting said belt in said first area of contact.

6. A document handling apparatus according to claim 5, wherein said belt moves a document in said first direction onto a platen and registers said document in said second direction against a stop.

* * * * *